May 29, 1951 J. L. F. VERNEY 2,555,069
MACHINE FOR CUTTING TUBES AND THE LIKE
Filed July 16, 1946 2 Sheets-Sheet 1
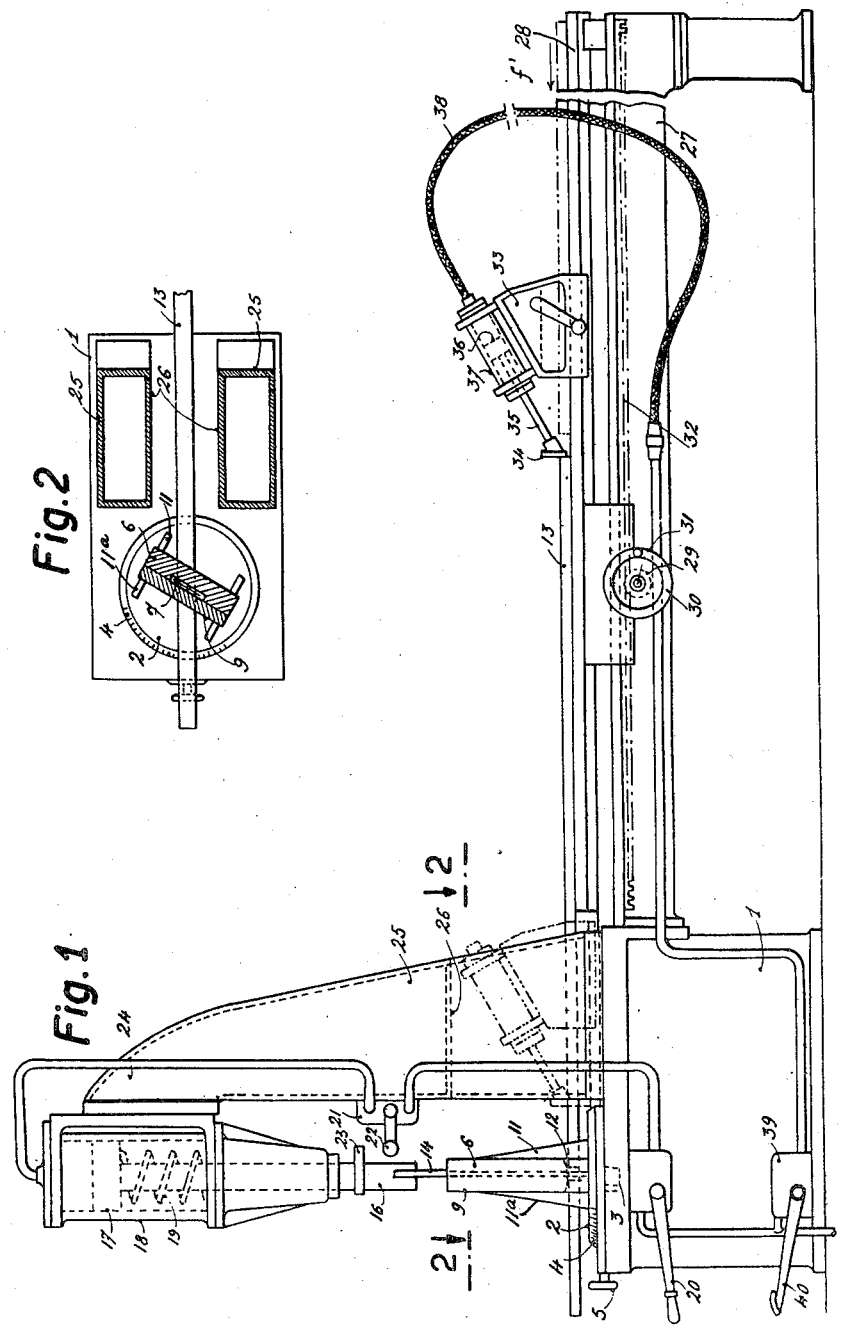
Inventor
J. L. F. Verney

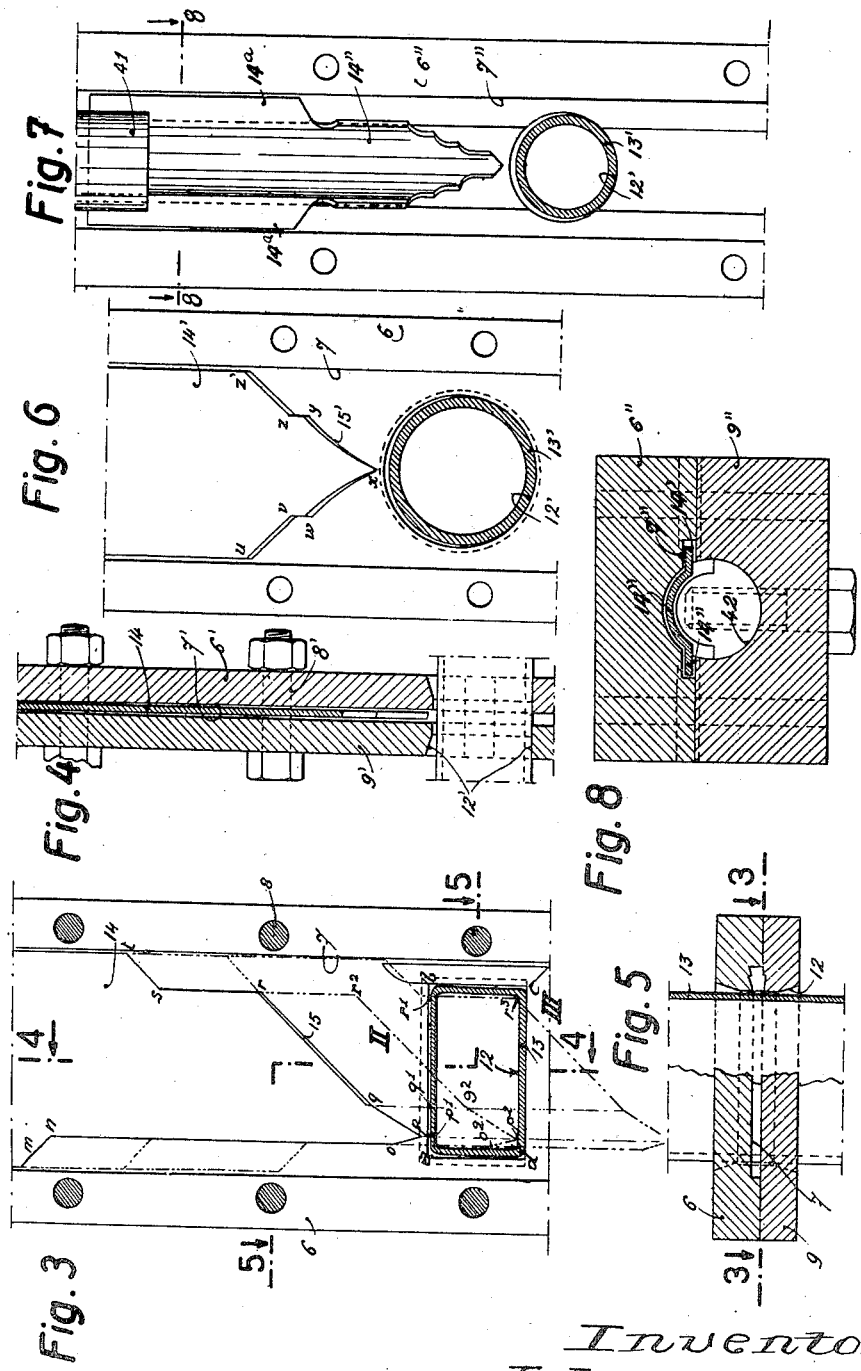

Patented May 29, 1951

2,555,069

UNITED STATES PATENT OFFICE 2,555,069

MACHINE FOR CUTTING TUBES AND THE LIKE

Jean Louis François Verney, Le Mans, France

Application July 16, 1946, Serial No. 684,039
In France December 20, 1945

1 Claim. (Cl. 164—47)

It is known that for the rapid cutting of tubes of round, square, rectangular or other section by machine, ribbon saws are generally used, or circular saws, or milling saw cutters, that is to say, machines in which the tool possesses either a rotary movement or an alternating translatory movement, or both movements in combination.

The cuts thus obtained are not clean, and a deburring operation is usually indispensable. Moreover, despite all precautions taken, there is a risk of accidents, due to the fact that the workman is required to handle either the cutting tool or the tubes.

The purpose of the present invention is to provide an improved machine for cutting tubes of round, rectangular or other cross section, and also similar pieces which makes it possible to obviate these disadvantages.

This machine is unusual principally owing to the fact that it is of the guillotine type, the tool being guided in a slide and under the action of hydraulic, pneumatic or other actuating means, shearing the tube, which is held in a steady, and to the form of which the steady is adapted, the said holding arrangement also comprising a slot through which the tool passes.

According to another feature, the cutting edge of the tool is formed by one or more parts at an angle of the direction of the displacement, in such a way that the tool forms a point intended to penetrate in the manner of a punch into the tube to be cut, the tool then operating in the manner of shears.

When the tube to be cut is of square or rectangular section, the cutting edge of the tool is preferably unsymmetrical, so that the punching part contacts the wall of the tube near one of its walls parallel to the direction of the displacement of the tool, so as to prevent a deformation of the wall perforated by the point of the tool.

When the tube is of circular section, the cutting edge of the tool is preferably symmetrical with relation to its longitudinal axis.

According to another feature, the cutting edge of the tool comprises parts with different angularities either connected directly to each other or separated by non-cutting parts parallel to the direction of displacement of the tool.

The tool is constituted either by one blade or by several blades or similar members suitably arranged with relation to each other. The transverse section of the tool may be rectilinear, curved to an arc of a circle for example, or into U-shape, V-shape, circular etc., and the slide has of course a form suited to this section.

The steady is preferably so mounted as to be rotatable about an axis coinciding with the axis of movement of the cutter, which enables the tubes to be cut as required, along straight or oblique sections.

Other features and advantages will be gathered from the following description.

In the accompanying drawings, given solely by way of example:

Figure 1 is an elevation view of a machine according to the invention;

Figure 2 is a part horizontal section on the line 2—2 of Figure 1;

Figure 3 is an elevation view of the blade and its guide arrangement, the two parts constituting which are assumed to be separate according to the line 3—3 of Figure 5.

Figure 4 is a longitudinal section of same on the line 4—4 of Figure 3.

Figure 5 is a cross section on the line 5—5 of Figure 3.

Figure 6 is a view similar to that in Figure 3, in the case of a tool for a tube of circular section.

Figure 7 is a similar view in the case of a tool of curved cross section; and

Figure 8 is a horizontal section on the line 8—8 of Figure 7.

According to the constructional form shown in Figures 1 to 5, the machine comprises, in Figures 1 and 2, a bed plate 1, forming the structure upon which is mounted in rotatable manner a support 2, formed by a disc mounted so that it can rotate in the bed plate 1. The edge 4 of the disc 2 is graduated, which makes it possible to impart to the latter any required angular position with relation to a locking screw 5, which is carried in the bed plate, and which enables the disc to be locked in any desired position. A vertical plate 6, comprising a flat slot 7 (Figures 3 to 6), is fixed on this disc 2, or forms part of it. On this plate 6 a backing plate 9 is fixed by means of bolts 8 or other means in such a way that the groove 7 forms with it a flat slide of rectangular section.

The two plates 6 and 9 are reinforced externally by ribs 11 and 11a (Figures 1 and 2).

Towards their base the two plates 6 and 9 comprise, facing each other, an opening 12 whose form and size correspond, plus a slight clearance, with the form and external dimensions of the section to be obtained of the tube 13 to be cut. Thus for instance, in the case of a tube of rectangular section abcd (Figure 3), the hole 12 forming the steady has the same form.

In the case of the tube of rectangular section, the side and top faces (Figures 3, 4 and 5) of the openings forming the steady are preferably opened out from the slide 7 to the external faces of the plates 6 and 9. The dimensions of the steady 12 corresponding to those of the tube section to be obtained are thus those of the opening of this steady into the slide 7. In the slide 7 is mounted in sliding fashion with a slight clearance the blade 14 forming the tool. This blade comprises a cutting edge 15 on its lower face.

In the case where the machine is intended to cut tubes 13 with rectangular section (Figure 3) this cutting edge is formed from the left to the right by an oblique part $mn$ followed by a longitudinal cut-in part $no$ of fairly large length, then a short part $op$ which is very steep, ending up at the vertex or point $p$; from this point $p$ the cutting edge is directed upwards, first with a very oblique part $pq$, and then a part $qr$ slightly less oblique. This part is followed by a longitudinal cut-in part $rs$, and the cutting edge terminates in an oblique part $st$. The cutting edge thus forms a non-symmetrical point with relation to the medial longitudinal axis 4—4 of the blade 14. The longitudinal distance between the point $p$ and the start $r$ of the cut-in part $rs$ is greater than the length $bc$ of the little side of the tube 13 to be cut.

The oblique part $qr$ of the cutting edge 15 possesses a slight clearance turned towards the right in Figure 1.

The blade is fixed at its upper end above the plates 6 and 9 to the movable arrangement 16 of a hydraulic or pneumatic device, making it possible to impart to this blade a vertical alternating movement. The arrangement is for example of the single-acting type. The moving arrangement comprises for example a piston 17 impelled downwards by means of a fluid under pressure admitted to the upper part of the cylinder 18, the upward movement of the piston being ensured by means of a resilient return means 19. The distribution of the fluid under pressure is ensured for example by a hand lever 20 and an automatic distributor 21, such that a lever 22 makes it possible to exhaust the cylinder 18 when this lever is met in downward travel by a stop 23 carried by the moving arrangement 16. This moving arrangement is of such construction that it can turn with respect to the cylinder 18 in which it is displaced, so that the blade 14 can follow the slide 7, when, by the rotation of the disc 2 on the bed plate 1, this slide, and consequently also the blade 14 are turned about the vertical axis passing through the centre of the disc 2 and the longitudinal axis of the actuating arrangement.

This arrangement is fixed to a standard 24 connected to the bed plate 1 of the machine by means of two posts 25, a space being left between them at 26 above the bed plate.

This space 26 is intended to allow the tube 13 to be cut to be placed on the bed plate 1, which is extended by a table 27 (Figure 1) in the rear. The tube 13 is fixed on a carriage 28, which is movable in the direction of the arrow $fl$ (Figure 1), and in the reverse direction by any suitable means, for example, by means of a pinion 29, fixed to a hand wheel 30. This pinion and wheel are keyed to an axis 31 which turns in the carriage 28, and the pinion engages with a toothed rack 32 fixed along the table 27.

An auxiliary carriage 33 is provided, which is adjustable along the tube-carrying carriage 28. This carriage carries a stop 34, fixed to a piston rod 35. The piston 36 is located in the cylinder 37, into which a fluid under pressure can be admitted behind the piston. The admission of the fluid through a line of piping 38 is controlled by a distributor 39, regulated for example by a pedal 40.

The working of the machine as a whole is as follows:

The blade 14 being fixed, the direction of the slide 7 is adjusted, and consequently that of the knife 14, according to the direction which it is desired to give the cut (straight or angled section). The tube 13 is then engaged in the steady 12, which is possible even in the case of an oblique cut by reason of the opening cut of the walls of the steady, it being possible for this angularity to reach as much as 30 to 45°. The tube 13 bears at its end against the stop 34. The fluid under pressure has been admitted into the cylinder 37 behind the piston 36 fixed to this stop.

By means of the lever 20, fluid under pressure is then admitted into the cylinder 18. The knife 14 descends, and when it reaches the steady 12 its cutting edge cuts the tube, in a fashion which will be hereinafter analysed.

The cutting completed, the knife 14 is returned by means of the return spring 19, the return travel being controlled automatically by the stop 23, which acts on the lever 22 of the automatic stop and return unit, this unit opening the exhaust, as already described above, the piston 17.

The removable stop 34 makes it possible to replace the tube cut with another, and thus to cut as many tubes as required to exact dimensions, the stop thus serving as a gauge.

The cutting operation properly so-called takes place in the following manner, in the case of a tube of rectangular section (Figure 3). The knife reaches the tube 13 with its point $p$ at $p^1$ near the vertical side of the tube $ad$, that is to say, at a point which can offer maximum resistance to the force of deformation of the tube, due to the pressure of the knife, which operates in the manner of a punch. The knife then tears a small area on the surface of the tube, without deforming it, for the reasons stated, towards the inside of the said tube, then as soon as the point $p$ has reached the inside of the tube, the oblique parts $pq$ and $qr$ shear the top of the tube from $p^1$ to $r^1$, forming small cuttings. However, when the knife reaches the position II ($o^2p^2q^2r^2$), the point $p$ starts to punch the lower face $cd$ of the tube at $p^2$, and then continues by a shearing action as in the case of the upper face. When the point $r$ of the blade reaches the point $r^3$ (position III of the blade) the two faces, upper $ab$ and lower $cd$ of the tubes are sheared. Owing to the vertical cut-in portions $on$ and $rs$, the vertical faces $bc$, $da$ of the tube have not been touched so far. After a new and very slight displacement of the knife, the part $st$ commences to engage with its edge the vertical side $bc$ of the tube at $r1b$, and it is only after this side has been sheared in its turn that the part $mn$ of the cutting edge engages the second vertical side $ad$, thus completing the cutting action. The cuttings roll up at first, and are then cut into small chips by the longitudinal parts $on$ and $rs$ of the blade, these small chips disengaging themselves readily. The purpose of the clearance angle 15 provided in the blade is to produce an oblique curling of the cuttings so as to obtain an oblique spiral instead of a straight one, and thus facilitate the disengaging of the cuttings. On the other hand, there is no clearance angle on the cutting parts $st$ and $nm$, since in view of the small amount of space between the tube and the steady, the cuttings curl normally and move downwards, there being no jamming against the wall of the steady, which would be the case if a clearance angle were provided which would force the cuttings against the walls.

It is to be noted that during the entire operation, the tube 13 is held perfectly by reason of the angularity of the cutting parts of the blade 14, these parts developing a transverse force on the tube, owing to which action the tube is forced against the corresponding side of the steady 12.

Figure 6 relates to the case in which the tube 13' to be cut is of circular section as shown, or elliptical. This steady is, moreover, double coned. The cutting edge of the blade is symmetrical with respect to the longitudinal axis of the blade and is formed by parts $uv$, $wx$, $xy$ and $zz^1$, which are rectilinear or slightly curved and separated by the clearance parts $vw$ and $yz$.

The operation of cutting is very similar to that described above except that it is symmetrical with respect to the vertical longitudinal axis of the knife 14' which slides in the groove 7' formed between plates 6' and 7' and has a cutting symmetrical edge 15'.

Figures 7 and 8 show a similar alternative form, in which however the tool 14" has a straight section in the form of the arc of a circle extended by two longitudinal plane guide wings 14a. This tool 14" is fixed to a tool-holder 41 of circular section, located in a cylindrical guide 42 provided in the parts 6" and 9".

In each case, the machine which is easy to operate, makes it possible to obtain perfect cuts, the tubes are not deformed, and the sections produced are sharply cut, clean and without burrs, making a de-burring operation unnecessary.

In addition, since the tool during the cutting operation is completely concealed in the slide 7, 7' or 7" the operator working the machine runs absolutely no risk of being hurt.

Of course, the invention is not in any way limited to the constructional forms shown and described, which are only given by way of example.

As already indicated, the form of the tool may be other than one of those shown. This tool may have a U or V form, circular etc., and may be formed by one or more parts suitably juxtaposed and joined.

The machine can be utilised for the cutting of profiled parts other than tubes.

The direction of displacement of the tool may naturally be other than a vertical descending one; it may be vertical and ascending, or again may have any direction whatsoever, horizontal or oblique. The tool may be driven electrically or by any other suitable means.

Having now described my invention what I claim as new and desire to secure by Letters Patent is:

A machine for cutting metallic tubes of rectangular cross section comprising a stationary frame, means for carrying the tube on said frame, a steady adapted to the contour of said tube and carried by said stationary frame, a plane cutting blade mounted in said frame said blade having two oblique cutting edges which are unsymmetrical with relation to the longitudinal axis of said blade and ending in a same point in order to punch the tube to be cut near one of its walls which are parallel to the direction of displacement of said blade, said unsymmetrical cutting edges of said blade comprising parts having different angularities separated by parts which are non-cutting and parallel to the direction of displacement of said blade, said parts being of such length that the blade first cuts the two faces of the tube perpendicular to the direction of displacement and then cuts the other two faces successively, a slot provided in said steady for the passage of said tool and means for giving an alternative motion to said tool.

JEAN LOUIS FRANÇOIS VERNEY.

REFERENCES CITED

The following references are of record in the file of this patent:

UNITED STATES PATENTS

| Number | Name | Date |
| --- | --- | --- |
| Re. 21,353 | Stone | Feb. 13, 1940 |
| 438,793 | Bayley | Oct. 21, 1890 |
| 528,738 | Pfouts | Nov. 6, 1894 |
| 683,289 | John | Sept. 24, 1901 |
| 897,984 | Kruger | Sept. 8, 1908 |
| 1,161,705 | Lloyd | Nov. 23, 1915 |
| 1,428,355 | Bradley | Sept. 5, 1922 |
| 1,513,100 | Frederick | Oct. 28, 1924 |
| 1,874,296 | Huntsberger | Aug. 30, 1932 |
| 2,064,539 | Hart | Dec. 15, 1936 |
| 2,144,335 | Jensen et al. | Jan. 17, 1939 |
| 2,198,599 | Borzym | Apr. 30, 1940 |